United States Patent Office 3,549,716
Patented Dec. 22, 1970

3,549,716
PREPARATION OF PERFLUOROOLEFINS
William Roy Deem, Runcorn, England, assignor to Imperial Chemical Industries Limited, London, England, a corporation of Great Britain
No Drawing. Filed Dec. 20, 1968, Ser. No. 785,783
Claims priority, application Great Britain, Jan. 11, 1968, 1,632/68
Int. Cl. C07c 17/00; C08f 3/24
U.S. Cl. 260—653.1       1 Claim

ABSTRACT OF THE DISCLOSURE

Tetrafluoroethylene tetramer is made by heating higher tetrafluoroethylene oligomers, particularly the pentamer and isomeric hexamers, with a fluoride of potassium, rubidium, caseium, tetramethylammonium or tetraethylammonium in an inert solvent medium, for example dimethylformamide, under anhydrous conditions at 50° C. to 200° C.

---

This invention relates to perfluoroolefins, particularly to oligomers of tetrafluoroethylene and to a process of thermally degrading higher oligomers to lower oligomers, particularly to the tetramer $(C_2F_4)_4$.

Oligomers of tetrafluoroethylene have been described in British specification No. 1,082,127. They comprise branched-chain, internally unsaturated perfluoroolefins having the empirical formula $(C_2F_4)_n$ where $n$ is an integer from 4 to about 10, particularly the tetramer, pentamer, hexamer and heptamer.

The process for making these oligomers, namely contacting tetrafluoroethylene with a fluoride, for example potassium fluoride or caesium fluoride, in an inert solvent reaction medium gives a mixture of oligomers in which the pentamer predominates and the proportion of tetramer is relatively small. The pentamer, whose molecule contains at least one reactive fluorine atom, is a starting point for making derivatives having useful properties particularly surface-active properties. The tetramer is not so useful chemically but being more heat-stable than the other oligomers is more useful as an evaporative coolant, heat-transfer medium and reaction solvent.

We have found that when the pentamer, or hexamer or higher oligomers are heated under relatively mild conditions in the presence of an alkali metal fluoride or tetraalkylammonium fluoride and in a suitable solvent medium good yields of the tetramer are obtained. The tetramer (I) does not undergo degradation under these conditions because it does not contain a vinylic fluorine atom; we have found that the presence in the oligomer molecule of at least one vinylic fluorine atom is necessary if this type of degradation is to take place.

By vinylic fluorine atom is meant a fluorine atom attached to one or other of the carbon atoms of an ethylenic double bond, as for example in the pentamer (II).

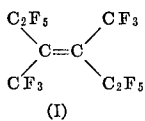

(I)

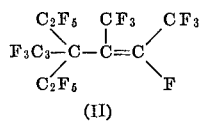

(II)

The invention thus provides a process for making tetrafluoroethylene tetramer, $(C_2F_4)_4$, comprising heating a higher tetrafluoroethylene oligomer $(C_2F_4)_n$, where $n$ is an integer greater than 4, with a fluoride of potassium or of rubidium or of caesium or of a tetraalkylammonium radical, in an inert solvent reaction medium under anhydrous conditions.

Suitable solvents include dimethyl formamide, dimethyl acetamide and the dimethyl ether of diethylene glycol.

The process appears not to operate, or at most only very slowly, in acetonitrile or dimethoxyethane as reaction medium.

Suitable reaction temperatures are from about 50° C. to 200° C.; it is thus convenient to carry out the process by refluxing the reaction mixture under atmospheric pressure, though higher pressures may be employed. A minor proportion of iodine may be added to the reaction mixture if desired but it is not essential. After the period of refluxing, the tetramer can be separated by fractional distillation and any undegraded higher oligomers returned for further subjection to the process of the invention.

The invention is illustrated by Examples 1–4.

EXAMPLE 1

A mixture of pentamer $(C_2F_4)_5$ (20 g.), caesium fluoride (15 g.), iodine (12 g.) and dimethyl formamide (100 ml.) was heated under reflux for 78 hours during which time the reflux temperature fell from 135° C. to 90° C. The cooled reaction mixture was poured into water and the lower layer separated and dried over calcined magnesium sulphate. The product (10 g.) was identified by infra-red spectroscopy and gas-liquid chromatography as the tetramer $(C_2F_4)_4$ (63% yield).

EXAMPLE 2

A mixture of isomeric hexamers (20 g.), caesium fluoride (15 g.), iodine (12 g.) and dimethyl formamide (100 ml.) was heated under reflux for 24 hours during which time the reflux temperature fell to 90° C. The cooled reaction mixture was poured into water and the lower layer separated and dried over a molecular sieve. The products (12 g.) were separated by gas-liquid chromatography into tetramer (3 g.) and pentamer (1.6 g.).

EXAMPLE 3

A mixture of pentamer (20 g.), caesium fluoride (15 g.) and dimethyl formamide (100 ml.) was heated under reflux for 24 hours. The cooled reaction mixture was poured into water and the lower layer separated and dried over a molecular sieve to give the tetramer (11 g. 68% yield) which was identified by infra-red spectroscopy and gas-liquid chromatography.

EXAMPLE 4

A mixture of pentamer (20 g.), caesium fluoride (15 g.) and the dimethyl ether of diethylene glycol (100 ml.) was heated under reflux for 24 hours. The cooled reaction mixture was poured into water and the lower layer separated and dried over a molecular sieve to give a mixture of pentamer and tetramer (2 g.).

EXAMPLE 5

A mixture of pentamer (20 g.), caesium fluoride (5 g.) and dimethyl formamide (60 ml.) was heated under reflux for 10 hours. The cooled reaction mixture was poured into water and the lower layer (13 g.) separated, washed and dried. Gas-liquid chromatography showed the layer to contain tetramer (10 g.) and pentamer (3 g.).

EXAMPLE 6

A mixture of isomeric hexamers (20 g.), caesium fluoride (5 g.), iodine (12 g.) and dimethyl formamide (100 ml.) was heated under reflux for 16 hours. The products (2 g.) were composed of tetramer (80%), pentamer (15%) and two unidentified components (5%) by weight.

EXAMPLE 7

A mixture of tetrafluoroethylene pentamer (40 g.), potassium fluoride (15 g.) and dimethyl formamide (100 ml.) was heated under reflux with stirring for 24 hours. The cooled reaction mixture was poured into water and the lower layer separated and dried over a molecular sieve to give a mixture of tetramer (14 g.) and pentamer (10 g.).

EXAMPLE 8

A mixture of tetrafluoroethylene pentamer (40 g.), potassium fluoride (15 g.) and the dimethyl ether of diethylene glycol (100 ml.) was heated under reflux with stirring for 24 hours. The cooled reaction mixture was poured into water and the lower layer separated and dried over a molecular sieve to give a mixture of tetramer (10 g.) and pentamer (15 g.).

EXAMPLE 9

A mixture of isomeric tetrafluoroethylene hexamers (20 g.), potassium fluoride (10 g.) and dimethyl formamide was heated under reflux with stirring for 24 hours. The cooled reaction mixture was poured into water and dried over a molecular sieve to give a mixture of tetramer (3 g.), pentamer (4 g.), isomeric hexamers (6 g.) and two unidentified components.

What I claim is:

1. A process for making tetrafluoroethylene tetramer $(C_2F_4)_4$, comprising heating under anhydrous conditions to a temperature from 50° C. to 200° C. a composition which consists essentially of at least one oligomer selected from the group consisting of the pentamer $(C_2F_4)_5$ and isomeric hexamers $(C_2F_4)_6$ of tetrafluoroethylene, a fluoride selected from fluorides of potassium, rubidium, caesium, tetramethylammonium and tetraethylammonium and an inert solvent selected from the group consisting of dimethylformamide, dimethylacetamide and the dimethylether of diethylene gycol and separating tetrafluoroethylene tetramer from the reaction products.

References Cited

UNITED STATES PATENTS 3,223,739   12/1965   Teumac _____ 260—653.1
3,403,191   9/1968    Graham _____ 260—653.1

FOREIGN PATENTS 1,082,127   3/1966    Great Britain _____ 260—653.1

DANIEL D. HORWITZ, Primary Examiner

U.S. Cl. X.R.

252—67, 73, 364